Oct. 14, 1941.     L. V. MITELMAN     2,258,859
MACHINE FOR ANALYZING CURVES OR GRAPHS
Filed Aug. 18, 1939     5 Sheets-Sheet 1
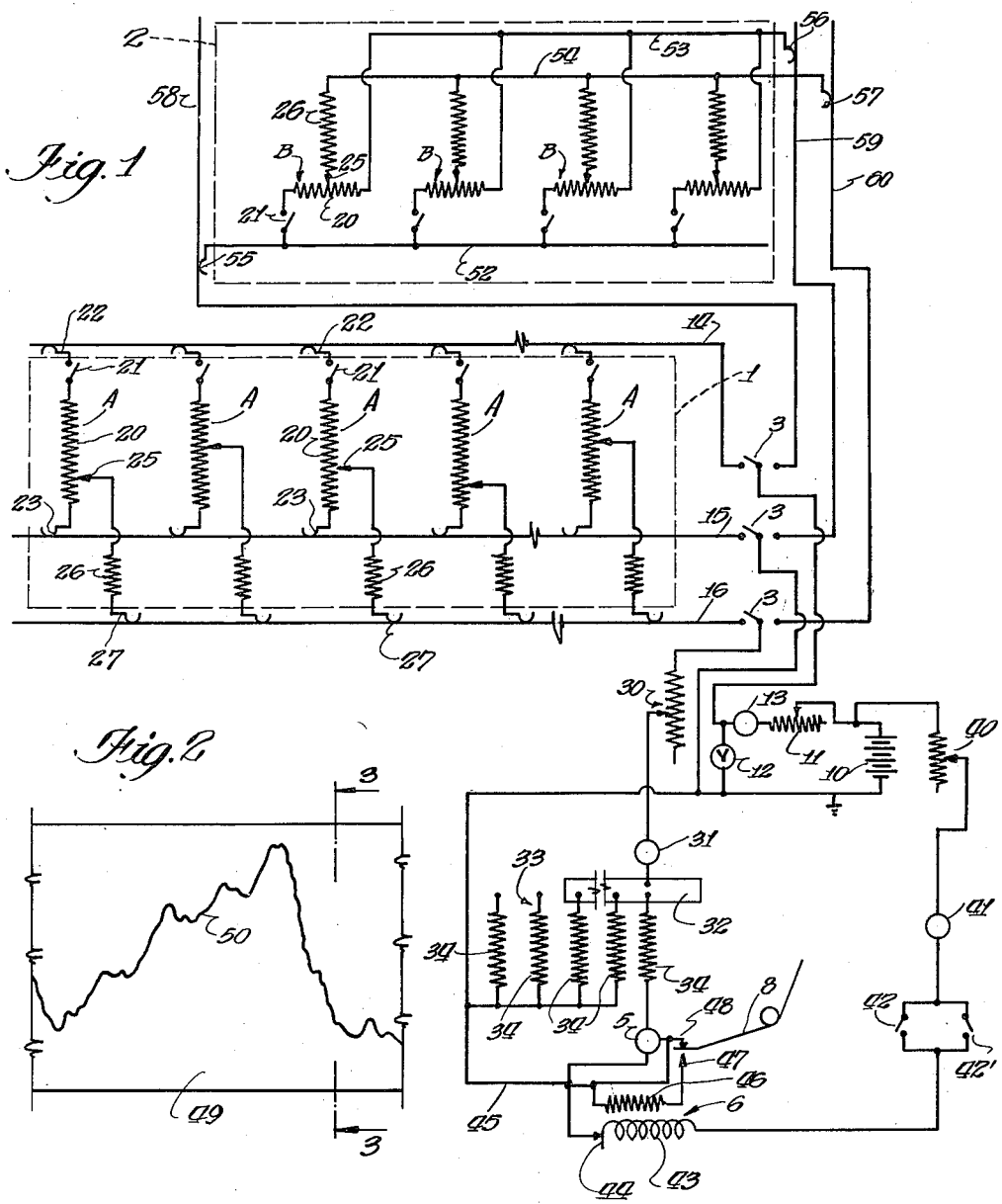
Inventor:
Leon V. Mitelman
By: Morris Spector
Attorney.

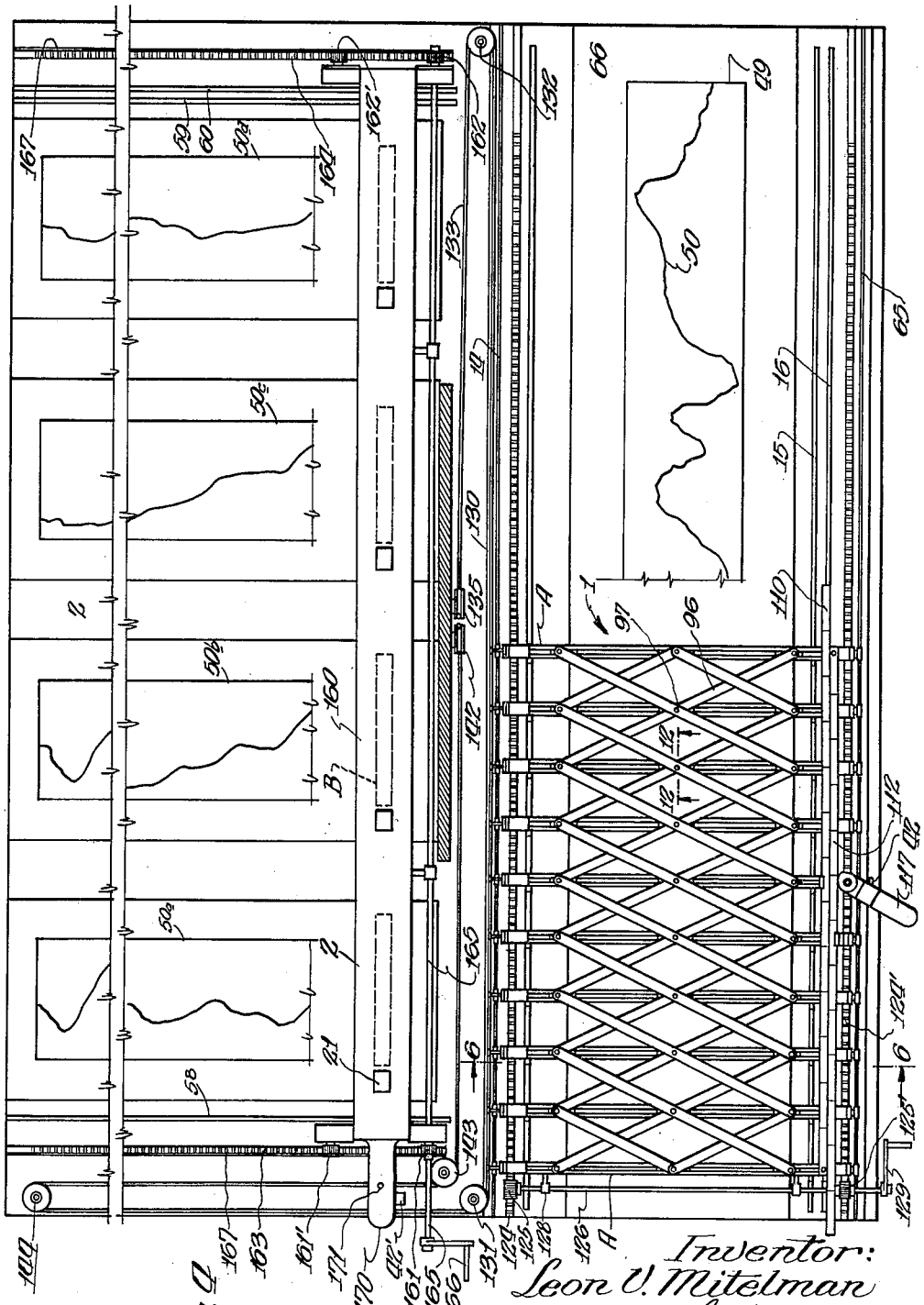

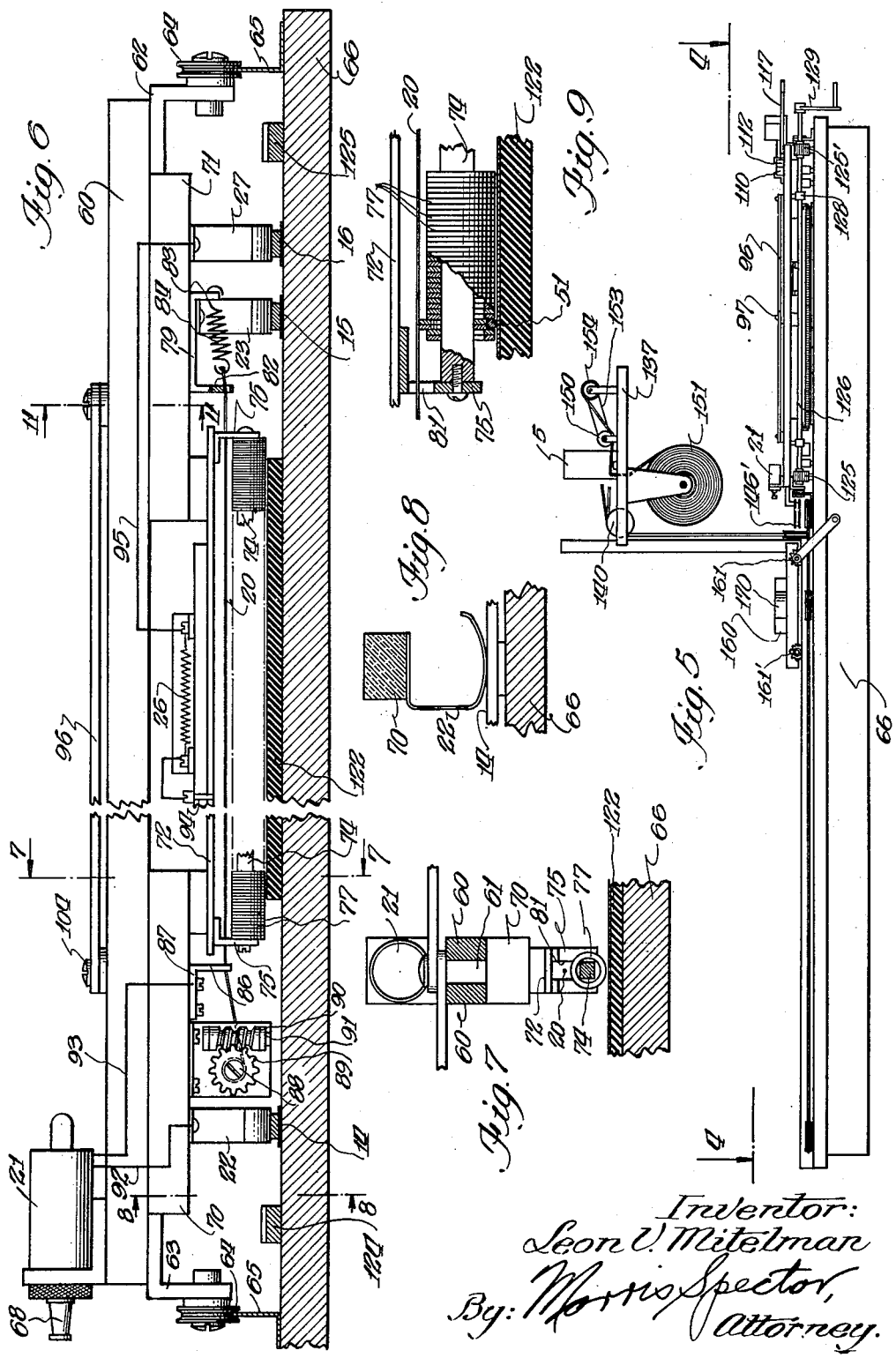

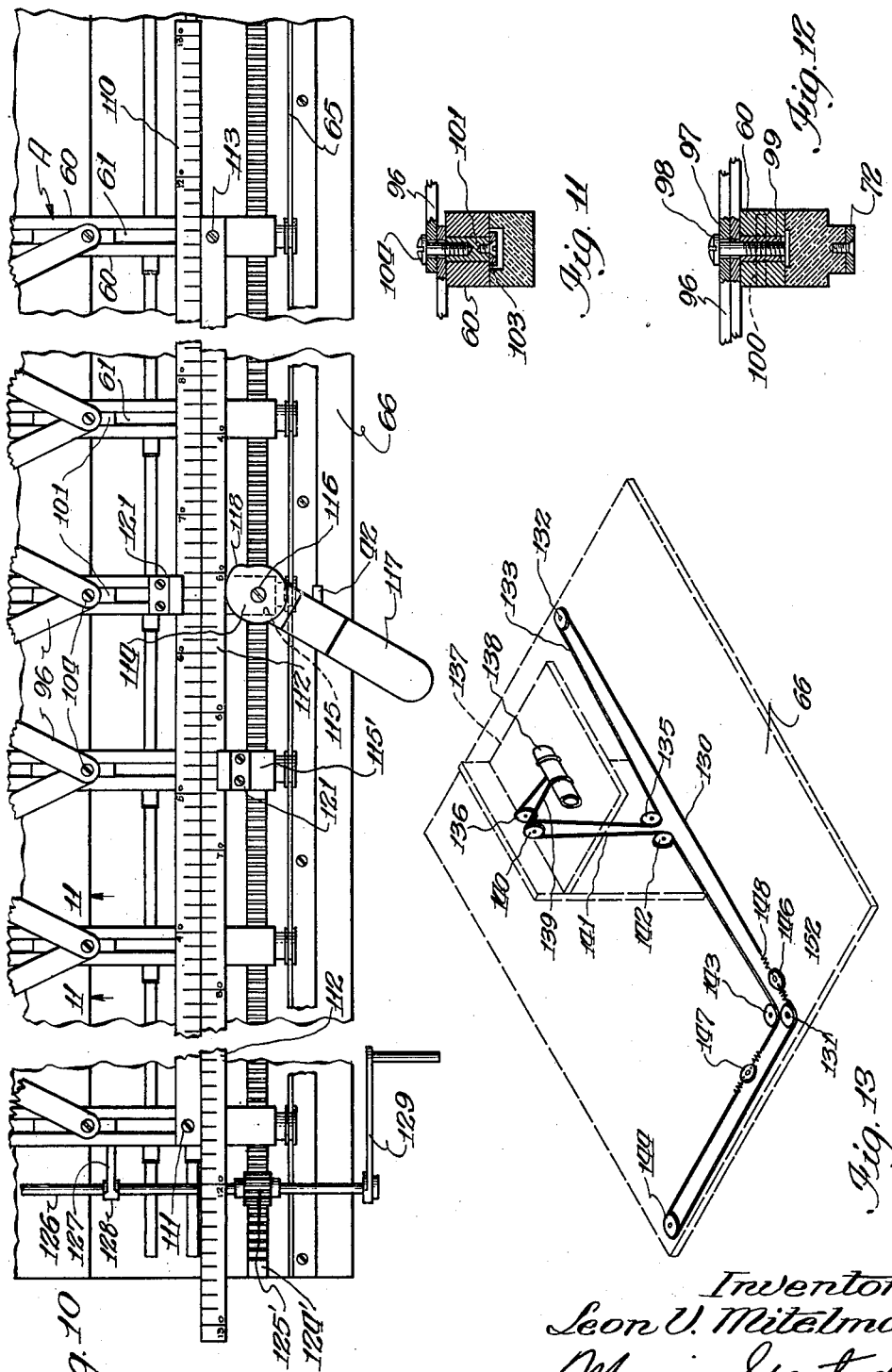

Oct. 14, 1941.  L. V. MITELMAN  2,258,859
MACHINE FOR ANALYZING CURVES OR GRAPHS
Filed Aug. 18, 1939  5 Sheets—Sheet 5

Inventor:
Leon V. Mitelman
By: Morris Spector,
Attorney.

Patented Oct. 14, 1941

2,258,859

UNITED STATES PATENT OFFICE 2,258,859

MACHINE FOR ANALYZING CURVES OR GRAPHS

Leon V. Mitelman, Chicago, Ill.

Application August 18, 1939, Serial No. 290,843

19 Claims. (Cl. 235—61)

This invention relates to a machine for and a method of analyzing graphs or curves.

It is one of the objects of the present invention to provide a machine which can automatically produce a curve which is the function of the ordinates of one or more given curves. The curve produced may be the algebraic sum of a number of other curves or it may be a curve the ordinates of which are the average values of a plurality of equally spaced ordinates on a given curve.

I have found that in the analysis of curves it is frequently desirable to produce a curve each ordinate of which is of the average value of a plurality of uniformly spaced ordinates on a given curve. It is one of the objects of the present invention to provide a machine which can find the average value of a number of equally spaced ordinates of a curve, and record graphically consecutive averages as successive groups of such equally spaced ordinates are averaged over the whole length of the curve. So, for instance, an average is obtained of, say, ten ordinates spaced twelve units apart on the abscissa. The space of twelve units on the abscissa is maintained for one set of recording over the entire length of the curve to produce a new curve each ordinate of which is of the average value of ten ordinates spaced twelve units apart on the abscissa commencing from successively spaced points on the abscissa. In curve analysis I have found that it is frequently desirable to produce a plurality of separate curves in the same manner wherein the differences between the respective curves lie in the fact that different uniform spacings of the ordinates being averaged are taken for each of the curves produced, the same uniform spacing being maintained throughout the production of any one curve. A plurality of such curves are then added together to produce a new curve. It is an object of the present invention to provide a machine for producing such average curves and such summation curve.

It is a further object of the present invention to provide a machine wherein the number of ordinates being averaged, in order to produce an average for the new curve, may be varied at will from one to the maximum number for which the machine is constructed, and wherein the spacings of the ordinates being averaged may be varied at will in a quick and expedient manner.

In accordance with the preferred embodiment of the present invention I move a plurality of potentiometers across a sheet containing the curve to be analyzed. Each potentiometer includes a member for varying the current output of the potentiometer, the effective setting of the member being determined by the ordinate of the curve at the abscissa where the member is located. As each potentiometer is moved across the sheet containing the curve being analyzed the current output of the potentiometer varies as a direct function of the ordinates of the curve. The potentiometers are spaced apart a uniform distance, and the outputs of the potentiometers are delivered to a common instrument so that a current received by the instrument is a direct function of the sum of the outputs of all of the potentiometers. Since the potentiometers are spaced apart along the curve, the summation current from all of the potentiometers represents the sum of the values of the ordinates thus spaced apart. This is represented by a single value. By moving all of the potentiometers together across the curve the successive values of the sums of the potentiometer currents can be utilized to produce a single curve. This current, or a given fraction or multiple thereof, may be delivered to a recording instrument which records on a suitable tape. The recording instrument may be of any desired type and may produce its record either by operating a pen and stylus over a suitable moving tape, or by electrically puncturing a tape as by spark discharges, or may produce a photographic record of the current flow.

It is a further object of the present invention to provide an improved recording ammeter. The electrical part of the instrument may comprise a structure similar to that of known ammeters, including an axially rotatable coil which assumes a position that is a function of the current flowing therethrough. The rotatable shaft of the ammeter carries a cylinder or the like which extends axially of the rotatable shaft and is turned thereby so that the angular position of the cylinder or the like is a direct function of the current flowing through the ammeter. A helical curve is formed on the surface of the cylinder, said curve extending the full length of the cylinder and extending angularly about 90° or the maximum angular turning of the ammeter armature. This helical curve is made of electrically conducting material and is grounded. A metallic knife edge or the like extends adjacent and parallel to the cylinder so that for every position of the helix on the cylinder one point on the helix is at a minimum distance from this metallic plate. A high voltage is periodically applied to the metallic plate so that whenever the voltage is applied to the plate a spark discharge occurs between the plate and the point on the helix which is the minimum distance from the plate. A paper tape moves between the helix and the knife edge so that the repeated discharges produce pin point holes through the paper tape. These holes trace a curve on the paper. Since the cylinder above mentioned constitutes merely a support for the grounded helix, it is possible to make the helix of self supporting conducting material, such as a comparatively stiff wire bent to the helical shape, thus reducing the weight of the moving system.

It is a still further object of the invention to provide a machine which can add the ordinates of a plurality of curves and produce a curve the ordinates of which are the algebraic sums of those curves. This result is obtained, in the preferred embodiment of the present invention, by providing a carriage supporting a plurality of potentiometers as above set forth, each of which is arranged to follow its own particular curve and produce a resulting current which is a function of the ordinates of the particular curve involved. All of these currents are then sent, directly or indirectly, to a recording instrument which produces a graphic record that is a function of the algebraic sum of the ordinates of all of the curves involved.

It is a still further object of the present invention to provide a machine for analyzing one or a plurality of curves, which machine is provided with a movable carriage or the like carrying some means for following the curve or curves being analyzed and so arranged that the movement of the carriage produces a corresponding movement of a movable tape upon which the resulting analysis is being made.

It is a still further object of the present invention to provide a new and improved potentiometer the movable element of which is capable of following a variable curve and producing a current flow which varies as a direct function of the ordinates of the curve being followed. In the preferred embodiment of the present invention this potentiometer comprises a fine resistance wire tensioned between two points, and includes a variable contact for engaging the wire. The variable contact comprises a plurality of thin conducting washers mounted on a rod in close contact with one another for the full length of the rod and normally out of contact with the resistance wire but each capable of being pushed upward into contact with the resistance wire when the discs or washers are elevated by the curve being analyzed. The arrangement is such that the rod and the wire strung above and insulated from the rod extend above the curve being analyzed and parallel to the ordinates thereof. The curve being analyzed is raised from the surface on which it is formed.

While in the preferred arrangement the curve scanning device is an analyzer bar which is in physical contact with the curve being analyzed, and is controlled by the physical contact with a part of the curve, it is within the purview of the present invention to use any other type of curve scanning device. It is merely necessary that the scanning device be of such construction as to produce an electrical or electro-magnetic effect which varies as a function of the ordinates of the curve being analyzed. The electrical effect may be the production of a current or, what is the same thing, the production of a variable voltage, or it may be a variable magnetic or electro-static effect, which effects can be translated cumulatively to influence an electrical recording instrument.

It is a further object of the present invention to provide a graph or curve analyzing device of the above mentioned character wherein a plurality of analyzers are provided and wherein any one or more can be easily and quickly removed from the circuit.

It is a still further object of the present invention to provide a machine for producing a curve which varies as a desired function of a given curve and wherein means is provided for starting and stopping the graph recording portion of the apparatus in response to the starting or stopping of the graph analyzer. Another object of the present invention is to provide a machine of the above mentioned character wherein the motion of the tape upon which the record is produced may be synchronized with any one of a plurality of graph analyzers or integrators. It is a still further object of the present invention to provide a graph analyzer of the above mentioned character wherein different weights can be given to different ones of a plurality of curves being integrated, or wherein different weights can be given to the ordinates of a curve being produced.

It is a still further object of the present invention to provide a physical construction of a curve which readily lends itself to mechanical analysis by means of a scanning device adapted to follow the curve.

The attainment of the above and further objects of the present invention will be apparent from the following specification taken in conjunction with the accompanying drawings forming a part thereof.

In the drawings:

Figure 1 is a circuit diagram of the electrical connections of a machine constructed in accordance with the teachings of the present invention;

Figure 2 is a fragmentary diagrammatic view of a typical curve constructed for analysis by this machine;

Figure 3 is a sectional view taken along the line 3—3 of Figure 2 and showing the physical construction of the curve;

Figure 4 is a plan view of a machine constructed in accordance with the present invention, said view being taken along the line 4—4 of Figure 5 and looking in the direction of the arrows;

Figure 5 is an end view of the machine of Figure 4;

Figure 6 is an enlarged side view of one of the analyzer bars of the machine of Figure 4, in partial section;

Figure 7 is a sectional view taken along the line 7—7 of Figure 6;

Figure 8 is a fragmentary sectional view taken along the line 8—8 of Figure 6;

Figure 9 is an enlarged fragmentary sectional view illustrating the mounting of the disc washers upon the analyzer bar rod;

Figure 10 is an enlarged fragmentary plan view of a portion of the machine of Figure 4;

Figure 11 is a fragmentary sectional view taken along the line 11—11 of Figures 6 or 10 and showing the manner of connection of the lazy tongs to the ends of the analyzer bars;

Figure 12 is a fragmentary sectional view taken along the line 12—12 of Figure 4 and showing the manner of connection of the lazy tongs to the centers of the analyzer bars;

Figure 13 is a diagrammatic perspective view showing the driving connection between the analyzing carriages and the tape for the recorder;

Figure 14:
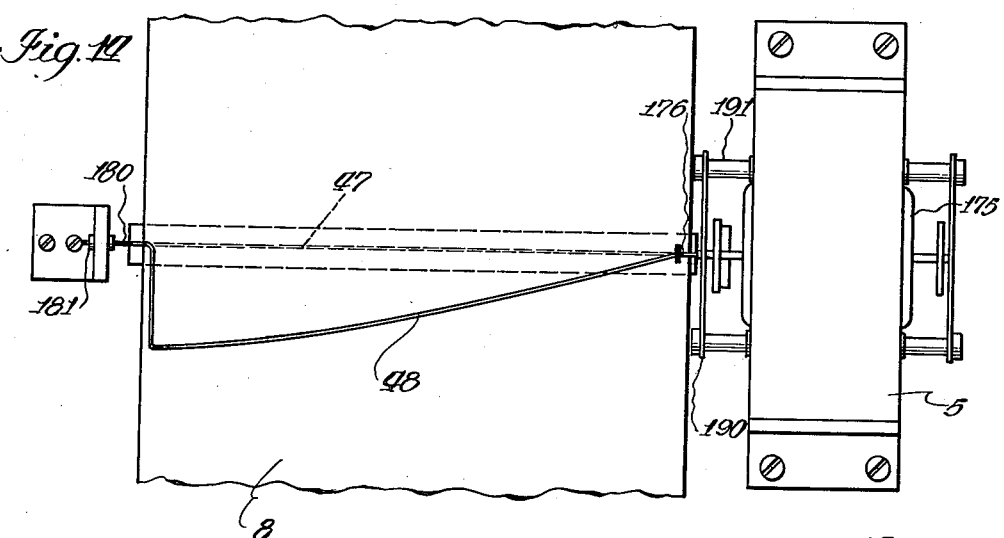
Figure 14 is a plan view of the recording ammeter.

Reference may now be had more particularly to Figure 1 illustrating the circuit connections. The graph analyzer comprises a table upon which are mounted two separate carriages, namely, an averaging carriage 1 and a summation carriage 2, each of which is independently movable and contains electrical instrumentalities adapted to be connected selectively by means of a three pole double throw switch 3 to the recording apparatus. The recording apparatus comprises a recording ammeter 5 and an induction device 6 adapted to apply a high voltage to produce a spark adapted to puncture a moving tape 8 at a point on the tape determined by the position to which the movable element of the ammeter has been moved by the current flowing therethrough. A battery 10 furnishes the current for operation of the machine. A variable resistance 11 is set to maintain a constant effective applied voltage by the battery, a volt meter 12 and an ammeter 13 being provided to determine the current and voltage.

The averaging carriage 1 moves over three stationary bus-bars, namely, a positive bus-bar 14, a negative bus-bar 15 and an output bus-bar 16, and is provided with brushes for connecting the various instrumentalities thereon to the proper bus-bars, as will be presently explained. The averaging carriage includes a number of separate analyzers "A" mounted thereon and movable with the carriage. Any desired number of analyzers may be provided. The analyzers are of identical construction and are so mounted on the carriage that they may be moved closer together or further apart while always maintaining the spacings between analyzers uniform. Each analyzer comprises essentially a potentiometer including a resistance 20 connected at one end through a manually operable switch 21 to a brush 22, and connected at its other end to a brush 23. A variable slide 25 is adapted to make contact along the resistance 20 and is connected through a resistor 26 to a brush 27. The brushes 22, 23 and 27 move with the carriage and slide on and maintain electrical connections with the bus-bars 14, 15 and 16, respectively. The resistor 26 is of a large value in comparison with the resistance 20, say of a ratio of fifty to one. The positive and negative bus-bars supply a fixed potential to the opposite sides of the potentiometer.

The output bus-bar 16 is adapted to be connected through the switch 3, a variable resistance 30, and an ammeter 31 to the conducting movable element or contact making member 32 of a proportioning resistance device 33. The proportioning resistance device 33 comprises a number of resistors 34 of identical values. The resistors 34 are preferably of low resistance, say, of the order of one ohm each, which is of a value very much less than the value of the potentiometer resistance 20. The contact making member 32 is slidable horizontally to connect one or more of the resistors 34 in the circuit, as desired. The right hand resistor 34 is always connected in circuit and extends the circuit to the recording ammeter 5. The remaining resistors 34 are connected directly to the negative side of the battery 10 and therefore provide a variable shunt around the ammeter 5 and the right hand resistor 34. It is thus apparent that a part of the current from the output bus-bar 16, which flows through the ammeter 31, will always flow through the recording instrument 5, and the rest of the current will be by-passed through one or more of the resistors 34. Since the resistors 34 are all of like value, it is apparent that the ammeter 5 will receive one-half, or one-third, or one-fourth, etc., of the current, from the bus-bar 16, depending upon whether two, or three, or four, etc., of the resistors 34 are connected in circuit. The total number of the resistors 34 provided is made equal to the total number of analyzer bars "A" on the carriage 1. The slide 32 is manually positioned so that the number of resistors 34 in circuit is equal to the number of analyzers "A" whose switches 21 are closed.

The induction device 6 is supplied with current from the battery 10 by way of a variable resistance 40, through an ammeter 41 and either of two parallel connected switches 42—42', to the primary 43 of the induction device, thence through the self-interrupter 44 of the induction device to the negative battery conductor 45. The induction device is of such construction that a very high voltage, say, of the order of 30,000 volts, is induced in the secondary 46 thereof. One side of the secondary 46 is connected to the knife edge 47 of a spark gap through which the paper recording tape 8 moves and over which the movable element 48 of the recording ammeter 5 moves, said movable element being connected to the opposite side of the primary 46. Upon operation of the device, sparks constantly jump between the knife 47 and the movable element 48, thus perforating the tape 8 at a point determined by the position of the movable element 48 of the recording ammeter 5.

The curve over which the analyzer moves is prepared for the instrument by first plotting the curve on suitable paper in the usual manner and then gluing a very thin flexible rubber tube over the curve line so that the curve is elevated from the surface of the paper on which it is plotted. Another method would be to glue a length of twine over the plotted curve and cover the twine with a solution of Celluloid in amyl acetate to provide a smooth surface. A sheet with an elevated curve constructed in accordance with the present invention is illustrated in Figures 2 and 3. The curve or graph to be analyzed is plotted on a sheet of paper 49. The curve or graph 50 is overlaid by a string-like member 51 which may be a rubber tube, a piece of cord suitably smooth, or the like, which member 51 follows the outline of the curve.

In order to understand the operation of the circuit thus far described it is sufficient to state that the physical construction of the apparatus is such that as the analyzer "A" moves over the curve being analyzed, the variable slide 25 follows the curve and thus moves along the resistance 20 so that for any position of the analyzer "A" over the curve the position of the slide 25 on the resistance 20 corresponds to the ordinate of the curve at that point of the analyzer.

A description of the operation of the circuit thus far described will now be given. Assume that it is desired to produce a curve each ordinate of which is of a value of the average of two ordinates on the curve being analyzed, said two ordinates being always the same fixed distance apart. As previously stated, the spacings between the analyzers "A" on the carriage 1 may be varied at will. Two analyzers "A" are therefore moved apart a distance equal to the required distance, and are then locked together against relative movement as the carriage which carries the analyzers is moved across the curve. The switch 3 is then closed to connect the bus-bars 14, 15 and 16 in circuit, and the two switches 21 of the two analyzers being used are closed, the switches of the remaining analyzers being open. Current now flows through the potentiometer resistances 20 of those analyzers whose switches 21 have been closed, and results in the application of a potential to the variable slides 25 of those analyzers. The potential applied to the variable slide 25 of each analyzer is determined by the position of that slide on the analyzer, which in turn is determined by the ordinate of the curve immediately under the slide 25. Current thus flows from the potentiometer through the variable slide 25 and the large resistor 26, to the collector or output bus-bar 16, the amount of current collected by the bus-bar 16 being equal to the sum of the currents supplied by the connected potentiometers. The current flowing from each potentiometer through its associated resistor 26 is directly proportionate to the voltage at 25, and therefore directly proportionate to the ordinate of the curve at the place where the analyzer happens to be located. The total current collected on the bus-bar 16 from the analyzers whose switches 21 are closed flows through the resistance 30, ammeter 31, to the movable contact making element 32. When only two analyzer bars are being used, the movable element 32 is moved to a position to establish contact with only two resistors 34, of which one is always the resistor that is connected to the recording ammeter 5. Thus the current divides at the movable contact making element 32, half of it going to the recording ammeter 5 and the other half passing through that resistor 34 which is connected directly to the negative side of the battery 10. Thus the current flowing through the recording instrument 5 is half of the current supplied by the two connected potentiometers, or the average of the two. If three potentiometers were connected in circuit then the movable element 32 would be connected to a position to contact three of the resistors 34 so that each one of the resistors 34 would carry one-third of the total current supplied by the potentiometers. The same plan is followed for any other number of analyzers used. The averaging carriage 1 is moved from left to right across the curve or graph being analyzed, while maintaining the uniform spacing between the analyzers mounted thereon. The current flowing through the recording ammeter 5 varies as the average of the instantaneous currents supplied by the connected analyzers. As the carriage moves from left to right, means is provided for simultaneously moving the paper tape 8 synchronously therewith. The movable element 48 of the recording ammeter 5 moves over the paper and, the switch 42 being closed, there is continuous sparking between the movable element 48 and the knife edge 47 so that the holes formed in the tape 8 constitute a record of the ammeter readings 5.

Assume that one graph is formed on the tape 8 by moving the carriage 1 across the graph being analyzed with a given spacing between the analyzers and a given number of such uniformly spaced analyzers used. Successive curves are then made on different parts of the tape 8 using either different uniform spacings of the analyzer bars or different numbers of uniformly spaced analyzer bars, or both. A series of spaced curves are thus produced upon the tape 8. It is then desired to add up those curves. Each of these curves of perforated holes is then reconstructed to produce an elevated curve, as in Figures 2 and 3, so that it can cause the variable potentiometer slide to follow it. The respective curves are then mounted side by side on the summation carriage 2. The summation carriage 2 includes a series of analyzers B, each of a construction similar to that of the analyzers A, and including switches 21, and resistors 26, as previously described. The summation carriage 2 includes a positive bus-bar 52 to which the potentiometers are connected through the switches 21, a negative bus-bar 53 to which all of the resistors 26 are connected, and a collecting or output bus-bar 54. These bus-bars are connected by brushes 55, 56 and 57 respectively, to bus-bars 58, 59 and 60 respectively, the brushes being movable with the carriage and continuously sliding in contact with the last mentioned bus-bars.

The summation carriage 2 is mounted for movement at right angles to the direction of movement of the carriage 1. Analyzers B on the summation carriage are fixed with respect to one another on the carriage. Separate curves are mounted directly under each analyzer B with the abscissas of the curves extending parallel to direction of movement of the carriage and with the ordinates of the curves extending at right angles to the direction of movement of the carriage. The curves are of such construction that as the carriage moves along the curves the variable slide 25 of each potentiometer follows its curve.

If the switch 3 is thrown to the right instead of to the left, positive battery potential is applied to the bus-bar 52 by way of the brush 55, and negative battery potential is applied to the bus-bar 53 by way of the brush 56. Current thus flows through the potentiometer resistances 20 of those analyzers that are connected in circuit by the closure of their corresponding switches 21. The current output at 25 of each potentiometer is delivered by way of the collecting or output bus-bar 54 and the bus-bar 60 to the recording ammeter 5. It is thus apparent that the instantaneous reading of the ammeter 5 will be the sum of the readings of the connected analyzers on the summation carriage 2 as the carriage moves across the table carrying the respective graphs 50 under each analyzer. The value of the summation current flowing through the recording instrument 5 can be multiplied or divided by by-passing a larger or lesser proportion of the current by means of the slide 32. If it is desired to obtain a curve the ordinates of which are equal to the sum of the ordinates on all of the curves being added, then the slide 32 is arranged to contact only the right hand one of the resistors 34. If the resulting ordinates on the record being made at 8 may become too large for the scale of the paper or of the instrument 5, then a fixed fractional part of the current may be by-passed at 33 so that the scale of the resulting summation curve at 8 is a fixed fractional part of the scales on the curves being summed up. If the ordinates of any one of the curves is to be subtracted from the sum of the others, this subtraction, which is merely algebraic addition, can be obtained by merely reversing the connections of the corresponding potentiometer resistance 20 or by reversing the curve which is to be subtracted.

In order that an understanding of the physical construction of the machine of the present invention may be had an explanation will first be given of the construction of one of the analyzers A, to which reference may be had more particularly to Figures 6 to 9 inclusive. The analyzer comprises two parallel metal bars 60 secured together in spaced relationship to define a groove 61 between them, thus forming a single longitudinally slotted bar. Brackets 62—63, of a generally L shape, are secured to the underside at opposite ends of the bar. Each bracket 63 carries a grooved roller 64, which rollers are adapted to ride on parallel tracks 65 on a supporting table 66. The switch 21, which may be of any standard construction, is mounted on top of the bars 60, and includes a pull-out piece 68 for operating the switch. Insulating strips 70—71 are secured to the underside of the bars 60 and support a brass or other conducting strip 72 spaced below the bottom of the bars 60. The resistor 26 is mounted on top of the conducting strip 72 but is insulated therefrom. A rod 74 of electrically conducting material is secured to the underside of the strip 72 by electrically conducting brackets 75 and has a large number of metal washers 77 of electrically conducting material strung thereon for the full length of the rod. The washers have an inside diameter appreciably larger than the diameter of the rod 74. The difference between the two diameters is approximately equal to the elevation of the curve 50 or to the thickness of the material 51 constituting the curve. Brushes 22 and 27 are mounted directly on the underside of the insulating strips 70 and 71, respectively. The brush 23 is secured to the underside of a conducting metallic bracket 79, of a generally C shape, which is secured to the insulator 71. The resistance wire 20, of nichrome, or other suitable electrical resistance material, is tensioned parallel to the rod 74 above the washers 77 and below the conducting strip 72. The resistance wire 20 extends through oversized holes 81 in the brackets 75, thus avoiding electrical contact with the bracket 75. The distance between the wire 20 and the top of the washers 77 when the washers are in their dependent positions is approximately equal to the thickness of the material constituting the curves to be traced. The right hand end of the wire 20, as seen in Figure 6, extends through the hole in an arm 82 of the bracket 79, and is secured to an opposite arm 83 of the same bracket by a tension spring 84. The wire contacts the arm 82 at the hole through which the wire extends, so that the end of the wire is electrically connected to the bracket 79 and through the bracket to the brush 23 which slides over the bus-bar 15 that is on the supporting table 66. The opposite end of the wire 20 extends through a hole in an arm 86 of a bracket 87 secured on the underside of the insulating strip 70, and makes electrical contact with the bracket 87 at the place where it passes through the arm. The wire then extends around a very small drum 88 that can be turned by a worm gear 89 and a worm 90 to increase or decrease the tension on the nichrome wire 20. To that effect the end of the worm 90 is made non-circular, as indicated at 91, to receive a turning key. The electric circuit extends from the positive bus-bar 14, through a conductor 92, through the switch 21, thence through a conductor 93, to the bracket 87 which carries the circuit to the nichrome resistance 20, thence through the resistance 20 to the bracket arm 82, thence through the arm 79 and brush 23 to the negative bus-bar 15.

When any one of the washers 77 is elevated it establishes a circuit from the nichrome wire 20 to the rod 74, thence through the rod to the opposite brackets 75 which are connected to the conducting strip 72, thence through the conducting strip and a conducting screw 94 to the resistance 26, and thence by way of a conductor 95 to the brush 27 and to the bus-bar 16.

The analyzers are connected together by a lazy tong mechanism 96. The centers 97 of the lazy tong bars are pivotally fixed to the respective analyzer bars in any desired manner, as by means of a screw 98 (Fig. 12) that threads into a spacer block 99 secured centrally between the metal rods 60 by a cross screw or pin 100. The ends of the lazy tong bars are pivotally connected to blocks 101 that are slidable in the groove 61 between the bars 60 but are held against upward retraction by short strips 103 secured to the underside of each block 101 and bearing against the metal rods 60. The ends of the lazy tong bars pivot freely about the shank of a screw 104 that is threaded into the spacer 101. It is thus apparent that the lazy tong mechanism 96 interconnects all of the analyzers A, as may be seen in Figure 4, and permits spreading of the analyzer bars from one another while maintaining a uniform spacing between them.

The analyzer bars may be adjusted to any desired spacing and then locked together to maintain the said spacing. A gauge bar 110, which extends over all of the analyzers, is secured to one of the analyzer bars, preferably the left hand one, by a screw 111 (Fig. 10). A similar gauge bar 112 is permanently secured to another analyzer bar, preferably the opposite end analyzer bar, by a screw 113. The two gauge bars 110—112 slide along one another as the analyzer bars are spread apart or made to approach one another. A cam 114 is pivoted on one of the analyzer bars, preferably a central analyzer bar 115, by a screw 116, and includes a handle portion 117. The cam face 118 of the cam 114 is adapted to press against the gauge bar 112 and force it into locking engagement with the gauge bar 110, thus locking the analyzer bars against relative movement from their adjusted positions, but permitting movement of the carriage, which includes all of the analyzer bars, the lazy tongs 96 and the gauge bars 110—112 on the tracks 65—65. The gauge bars 110 and 112 are each provided with a calibrated scale which commences with zero and extends the full length of the bar in terms of units or fractions of units of the abscissa of the curve to be analyzed, although any other calibration may be provided. The gauge bar 110 is calibrated progressively from left to right commencing with the left hand analyzer. The gauge bar 112 is similarly calibrated but from right to left, commencing with the right hand end analyzer. Two center analyzer bars 115 and 116 are provided with identifying means 121—121 which may be of any desired physical construction such as, for instance, a paint mark or metal angle members secured to each of these analyzers and bearing against the gauge bars. The portions of the two gauge bars 110—112 between the analyzers 115 and 116 will indicate the spacings between analyzer bars. In Figure 10 the sixty unit marks of the two gauge bars are located between the analyzers 115 and 116. The fifty-eight point on the gauge bar 110 is opposite the fifty-eight point on the gauge bar 112 between these two analyzers. No other identical gauge readings on the two scales are opposite one another. Therefore, the distance between the two analyzer bars is fifty-eight units.

If the paper 49 upon which the graph is plotted is calibrated so that there are twenty vertical lines or abscissa spacings to the inch, then the successive unit markings on the gauge bars should be 0.225 inch apart. This figure is arrived at from the formula $$S=\frac{d(n-1)}{2}$$

where
S=distance between unit markings on the gauge bar,
d=distance between unit spaces on graph paper,
n=number of analyzer bars.

With this calibration on the gauge bars the reading of the fifty-eight units indicates that the spacing between adjacent bars is fifty-eight units on the abscissa scale or 2.9 inches apart. If the analyzer bars were moved closer together then the gauge bar 112 would move to the left with respect to the gauge bar 110 thus bringing a lower reading on the gauge bar 112 into a position opposite a like reading on the gauge bar 110.

After the analyzer bars have been moved to their desired uniform spacing and locked together against relative movement by turning of the handle 117 to turn the cam 114 counter-clockwise, as previously described, the entire carriage may be moved from left to right along the table 66. In order to facilitate a uniform rate of motion of the carriage across the table a gear and rack drive is provided. This gear and rack drive comprises two racks 124—124' rigidly mounted upon the table 66 and engaged by spur gears 125—125' on a common shaft 126 which is secured to the left hand analyzer A by a number of brackets 127—127 carrying bearings 128—128 in which the shaft 126 is journaled. A crank 129 is provided for turning the shaft 126. Upon turning of the crank 129 the shaft 126 is turned, thus turning the two pinions 125—125'. These pinions ride on and are in mesh with the gear racks 124—124' so that as the pinions turn they roll upon the racks and move the carriage in one direction or the other, depending upon the direction of turning of the handle 129. During turning of the crank 129 the handle 117 may, if desired, be gripped by the operator to help guide the carriage in its movement across the table. The handle 117 also carries the switch 42, as may be seen in Figures 4 and 10, which switch controls the spark gap circuit, as was previously explained in connection with the circuit of Figure 1. The operator can at this time conveniently operate the switch 42 to start the induction coil.

The induction coil 6 causes continuous sparking to take place between the knife 47 and the movable element 48 of the ammeter. Since the paper tape 8 (Fig. 1) is interposed in the path of the spark and moves across the knife edge 47 it will be continuously perforated by the sparks in positions determined by the instantaneous positions of the ammeter needle 48.

As the potentiometer A moves across the sheet 49 the washers 77 all ride slightly above the sheet of paper 49. However, the string-like member 51, which constitutes the curve to be analyzed, is of such a thickness that it raises the one or two washers 77 in contact therewith so that the top portion of the circumference of the washer is in contact with the resistance wire 20 and the bottom inner periphery of the washer is in contact with the rod 74, thus establishing circuit connections between the rod 74 and the potentiometer resistance 20. It is thus apparent that the location of the place of contact between the potentiometer resistance 20 and the rod 74 is determined by the ordinate of the curve being analyzed at the place or abscissa where the analyzer is located. The contact established to the rod 74 by the washer which is in engagement with the resistance 20 thus places on the rod 74 a potential which is directly proportionate to the ordinate of the curve. A proportionate current thus flows through the rod, and the resistor 26 and brush 27 to the output or collection bus-bar 16. As the averaging carriage moves from left to right across the table the potential applied to any one rod 74 by the associated potentiometer resistance 20 continuously varies in proportion to the ordinates of the curve being analyzed. The currents thus produced flow through the circuit indicated in Figure 1 to the recording instrument. In order to cushion the potentiometers a comparatively soft thick rubber mat 122 is mounted on the table 66 and constitutes a support for the sheet 49 upon which the curve or graph to be analyzed is constructed.

An explanation will now be given of the manner of moving the recording tape for the recording ammeter 5 in synchronism with the movement of the averaging carriage 1. To effect such movement there is provided an endless rope drive which connects the means for advancing the paper tape 8 with the averaging carriage 1 (and also with the summation carriage 2). The endless rope drive, indicated at 130 in Figures 4 and 13, passes around a pulley 131, along the table 66, around a pulley 132, then back to the left at 133 along the table 66, then around a pulley 135, then vertically upward to a pulley 136, at a shelf 137 above the table 66. The shelf 137 supports the recording apparatus. The rope drive passes around the pulley 136, thence to and around a drum 138 and back along 139, around a pulley 140, and down at 141, around a pulley 142, thence horizontally along and above the table 66, around a pulley 143 then rearward along the table and around a pulley 144 to the pulley 131, forming an endless rope drive. Flat discs 146 and 147 are interposed in said rope drive, said rope being connected to the discs by short springs 148. Movement of either disc 146 or 147 causes movement of the rope drive, including the opposite disc and causes driving of the drum 138 at a linear speed exactly equal to the rate of movement of the rope drive. The drum 138 is connected to drive a platen 150 (Fig. 5) through a slipping clutch so that movement of the rope drive in one direction causes positive driving of the platen whereas movement of the rope drive in the opposite direction results in slippage of the clutch and no driving of the platen. Any desired and well known type of one-way drive clutch can be used between the drum 138 and the paper driving platen 150. The platen draws the paper 8 from a feed roll 151. A slip drive belt 153 drives a paper take-up roll 154 from the platen 150.

The averaging carriage 1 may be readily connected to or disconnected from the rope drive. For this purpose any one of the analyzer bars may be provided with a disc 146' (Fig. 5) rigid with the analyzer bar, which disc is adapted to be moved over the disc 146 and be connected therewith by a peg which is dropped through a central hole in the disc on the analyzer bar and through a hole 152 in the disc 146, thus connecting the two discs together. Thereafter, as the averaging carriage is moved from left to right, as seen in Figure 4, it moves the rope drive in one direction which is the direction at which there is a connection between the drum 138 and the platen 150. When the carriage is moved back from the right hand side of the table 66 to the left hand side thereof it also draws the rope drive back with it. At that time the reverse rotation of the drum 138 produces no movement of the platen.

An explanation will now be given of the construction of the summation carriage 2 insofar as this carriage differs from the averaging carriage 1, for which reference may be had to Figure 4. The summation carriage 2 is mounted on the table 66 in back of the averaging carriage 1 and for movement in a direction at right angles to the direction of movement of the averaging carriage. The summation carriage comprises a supporting structure 160 mounted on four rollers or wheels 161—161' and 162—162' which ride on tracks 163 and 164. The tracks 163 and 164 preferably comprise gear racks, and the wheels 161—161' and 162—162' preferably comprise pinions which ride on the racks and engage the same for driving the carriage. A shaft 165 connects the pinions 161 and 162 for driving the pinions, the shaft being also supported by the carriage 160 intermediate ends thereof through one or more suitable bearings to maintain the shaft in alignment. The shaft 165 is provided with a crank 166 at the end thereof for turning the same. As the shaft is turned it rotates the pinions 161—162 and thus moves the carriage 160 forward or backward upon the table, depending upon the direction of rotation of the shaft 160. By reason of the crank drive arrangement it is possible to obtain a uniform motion of the carriage 160 across the table. The carriage is guided against side movement on the table in any desired manner as, for instance, by providing the racks 163—164 with upstanding guide bars 167 at the ends thereof which prevent side movement or skewing of the carriage. The analyzers B, of a construction similar to the construction of the analyzers A, are mounted on the underside of the support 160 with the switches 21 of the analyzers B mounted above the supporting structure 160. The structure illustrated in Figure 4 includes four analyzers B. These four analyzers are mounted on the structure 160 in alignment with one another. The structure 160 includes bus-bars 52, 53 and 54 having brushes 55, 56 and 57, respectively, permanently connected thereto, as illustrated in Figure 1, and sliding upon bus-bars 58, 59 and 60, respectively, which are stationary on the supporting table 66. A handle 170 is permanently connected to the structure 160 for connecting the carriage to the rope drive, and carries the switch 42' which is connected in the circuit, as illustrated in Figure 1, for starting and stopping of the induction apparatus 6. The handle of the carriage 160 moves over the rope drive previously described and has an opening 171 through which a pin may be dropped to drop into a corresponding opening in the disc 147 on the rope drive to connect the carriage 160 with the rope drive. When this last mentioned pin is removed, the carriage is disconnected from the rope drive. In the operation of the apparatus only one of the two carriages 1—2 is connected to the rope drive at a time. It is thus apparent that when the carriage which is connected to the rope drive is moved along the table 66 it operates the rope drive without causing movement of the opposite carriage.

Assume that four different averaging curves have been made from a curve 50 by use of the averaging carriage 1, the four curves differing from one another in that either different uniform spacings of the analyzers on the averaging carriage 1 have been used or different numbers of analyzers have been used for the different curves. Each of the four curves produced by the recording instrument 5 is then overlaid by a piece of rubber tubing, rope, or the like, as heretofore described, so as to provide an elevated curve. These four curves thus produced are then mounted upon the table in position for analysis by the analyzers B, as indicated at $50_a$, $50_b$, $50_c$, and $50_d$, so that upon movement of the summation carriage 160 the analyzers B move over the respective curves $50_a$ to $50_d$. For any given position of the structure 160 each of the analyzers B will produce a current flow proportionate to the ordinates of the corresponding curve $50_a$ to $50_d$. As the carriage 160 is moved across the curves each curve will raise different ones of the disc washers 77 of the associated analyzer into engagement with the nichrome wire 20, as previously described; the positions of the discs which are raised changes with a change in ordinates of the curves. The current produced by the analyzers B are added up and delivered to the recording ammeter 5. The total magnitude of the current may be divided in any desired amount by shunting out a larger or smaller amount of the total current by the proportioning resistance 33. The curve produced by the recording instrument will thus have ordinates which vary as the algebraic sums of the ordinates of the four curves being analyzed by the summation carriage, which in turn is a function of the sum of a plurality of averages of uniformly spaced ordinates across the original curve 50 being analyzed.

Figure 15:
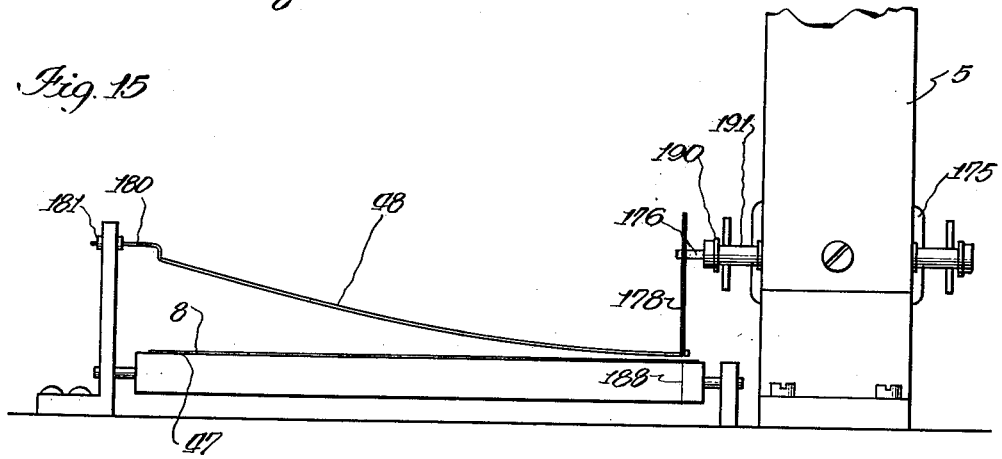
Figure 15 is a side view thereof.
Figure 16:
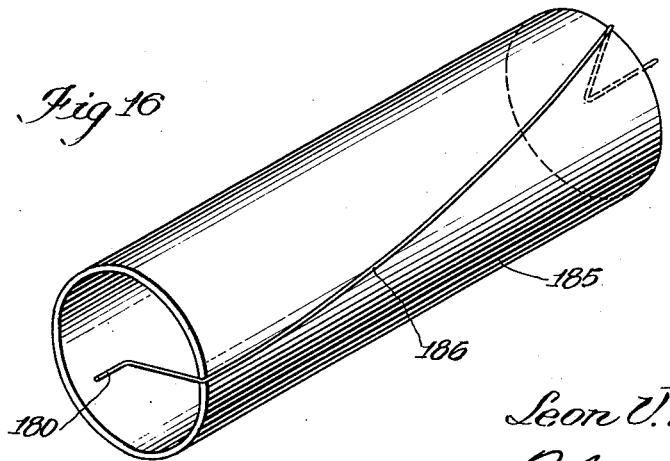
Figure 16 is a diagrammatic perspective view illustrating the manner of constructing a sparking helix of the recording ammeter.

An explanation will now be given of the mode of operation of the recording ammeter 5, to which reference may be had more particularly to Figures 14, 15 and 16. The ammeter comprises an ordinary ammeter having a rotatable armature 175 which moves through an angle proportionate to the current flowing through the instrument, as in the usual ammeter. The armature 175 is mounted on an armature shaft 176. A bar 190, supported by posts 191, provides a bearing for the end of the armature shaft. In lieu of the usual ammeter needle or pointer, a conducting wire 48 is mounted upon the armature shaft 176 to rotate therewith, but insulated therefrom. The wire includes a mounting portion 180 in alignment with the armature shaft. An insulating arm 178 is connected to the ammeter armature shaft and supports one end of the wire 48. The part 180 is journaled in a stationary bearing 181 which is grounded, to negative battery potential 6. The wire 48 is of a spiral shape determined in the manner illustrated more fully in Figure 16. A circular cylinder 185 is made of any desired material and has a spiral groove 186 formed therein. The spiral extends the full length of the cylinder and curves around the same approximately 90°, the curvature of the spiral groove 186 being such that equal angular distances along the cylinder 185 subtend equal lengths of the groove 186. With the cylinder 185 as a matrix a wire is bent to the shape illustrated in Figure 15 so that the portion 48 of the wire corresponds in shape to the shape of the spiral groove 186. A stationary conducting knife edge 47 is mounted beneath the wire 48 and is electrically connected to the secondary 46 of the induction coil 6 in the manner illustrated in Figure 1. The paper 8 moves over the knife edge 47 beneath the wire 48. It is thus apparent that for every different angular position of the ammeter armature, a different point on the wire 48 will be a minimum distance from the knife edge 47, said minimum spaced point being at a distance from the base line 188 which is directly proportionate to the angular turning of the ammeter armature shaft, or to the magnitude of current flowing through the ammeter. The spark between the wire 48 and the knife edge 47 will always occur at that point on the knife edge which is the minimum distance between the knife edge and the wire 48. The sparks will therefore produce a series of punctures through the moving tape, tracing on the paper tape a curve the ordinates of which are proportionate to the current flowing through the ammeter, which in turn is proportionate to the average or summation ordinates of the curve or curves being analyzed.

While I have herein described one particular type of recording ammeter and one particular type of graph analyzer adapted to follow a curve, it is within the purview of the present invention to provide specifically different types of recording ammeters and specifically different types of mechanisms for following the curve or graphs.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. Means for analyzing a graph, comprising an analyzer movable over the graph in a direction parallel to the abscissa and including electric circuit controlling means moved by the graph to produce an electric potential which varies in amount as a function of the ordinates of the graph, a recording instrument responsive to said potential, and means for moving a recording tape for said instrument in synchronism with the movement of the analyzer.

2. Graph analyzing means comprising a plurality of graph scanners mounted for joint action and spaced apart to scan different graph parts simultaneously, each of said scanners including means for producing an electric condition which varies as a function of the ordinates of the graph being scanned by the scanner, and means responsive to the algebraic sum of the electrical conditions produced by all of the scanners.

3. Graph analyzing means comprising means for finding the average value of a plurality of uniformly spaced ordinates of a graph, and means for producing a second graph the successive ordinates of which are proportionate to successively averaged values of ordinates the same uniform spacing apart commencing from successively spaced positions on the graph being analyzed.

4. Apparatus of the class described comprising graph supporting means, a movable carriage including a plurality of graph analyzers spaced from one another to analyze different graph parts simultaneously, said carriage being movable in a direction parallel to the abscissa of a graph being supported by said means, and each analyzer including means adapted to follow the graph and produce an electrical condition which varies as the ordinates of the graph vary.

5. Apparatus of the class described comprising graph supporting means, a movable carriage including a plurality of graph analyzers spaced from one another to analyze different graph parts simultaneously, said carriage being movable in a direction parallel to the abscissa of a graph being supported by said means, and each analyzer including means adapted to follow the graph and produce an electrical condition which varies as the ordinates of the graph vary, said carriage including means for simultaneously adjusting the spacings between all the analyzers while maintaining a uniform spacing between them.

6. Apparatus of the class described comprising graph supporting means, a carriage movable thereover, said carriage including a plurality of analyzers spaced from one another, each analyzer including a variable electrical resistance and means for varying the effective value of the resistance as a function of the ordinates of the graph as the carriage moves over the graph, and a common electric circuit including all of said resistances.

7. Apparatus of the class described comprising graph supporting means, a carriage movable thereover, said carriage including a plurality of analyzers, each analyzer including a variable electrical resistance and means for varying the effective value of the resistance as a function of the ordinates of the graph as the carriage moves over the graph, and means for producing another graph the ordinates of which vary as the algebraic sum of the effects produced by all of said resistances in a common circuit.

8. Graph analyzing apparatus comprising a plurality of potentiometers spaced from each other to analyze different graph parts simultaneously and each including a resistance and means for contacting the resistance at a variable position thereof, means for controlling the resistance contacting means to produce a potentiometer output voltage which varies as the ordinates of the graph being analyzed, a common circuit receiving the outputs of the respective potentiometers, and resistors interposed between the common circuit and the respective potentiometers, each of said resistors being of a resistance value substantially greater than the potentiometer resistance.

9. Graph analyzing apparatus comprising a plurality of potentiometers each including a resistance and means for contacting the resistance at a variable position thereof, means for controlling the resistance contacting means to produce a potentiometer output voltage which varies as the ordinates of the graph being analyzed, a common circuit receiving the outputs of the respective potentiometers, and resistors interposed between the common circuit and the respective potentiometers, each of said resistors being of a resistance value substantially greater than the potentiometer resistance, said potentiometers being relatively movable and uniformly spaced apart, and means for simultaneously altering the spacings between all of the potentiometers while maintaining a uniform spacing.

10. Graph analyzing means comprising a plurality of parallel side by side analyzers, and a lazy-tong linkage interconnecting the analyzers and permitting relative separating movement thereof while maintaining the spacing between them uniform.

11. Graph analyzing means comprising a plurality of parallel side by side analyzers, and a lazy-tong linkage interconnecting the analyzers and permitting relative separating movement thereof while maintaining the spacing between them uniform, each analyzer including a resistance extending lengthwise thereof and means controlled by a graph being analyzed for establishing circuit connections with the resistance at a variable position thereon.

12. Graph analyzing means comprising a plurality of similar side by side relatively movable graph analyzers uniformly spaced from one another, means for simultaneously altering the spacings between all the analyzers while maintaining a uniform spacing, and means for measuring the distance between the analyzers, said measuring means comprising two similar oppositely calibrated scales sliding on one another with one of the scales secured to one end analyzer and the other scale secured to the opposite end analyzer.

13. Graph analyzing means comprising a plurality of similar side by side relatively movable graph analyzers uniformly spaced from one another, means for simultaneously altering the spacings between all the analyzers while maintaining a uniform spacing, and means for measuring the distance between the analyzers, said measuring means comprising two similar oppositely calibrated scales sliding on one another with one of the scales secured to one end analyzer and the other scale secured to the opposite end analyzer, and means for locking the two scales together to lock the analyzers in their relatively adjusted positions.

14. Apparatus of the class described comprising means for supporting a graph, a plurality of spaced graph analyzer means secured together to scan different graph parts simultaneously, said two named means being relatively movable so that by relative movement of the two means the graph analyzing means simultaneously scan successive parts of a graph supported by said graph supporting means, a recording instrument controlled by all of said graph analyzing means simultaneously, a movable recording tape for said instrument, and means for moving the tape in synchronism with relative movement between said two first named means.

15. Apparatus of the class described comprising means for supporting a graph, a plurality of graph analyzer means secured together, said two named means being relatively movable so that by relative movement of the two means the graph analyzing means scans successive parts of a graph supported by said graph supporting means, a recording instrument controlled by said graph analyzing means, means for moving the graph analyzers with respect to one another while maintaining a uniform spacing between them, means controlled by each analyzer for producing a current flow which is a function of the ordinate of the graph opposite the analyzer and varying that current as a function of the ordinates of the graph upon relative movement of the graph and the analyzer, switching means for disabling any selected analyzer, means for collecting all of the current from the non-disabled analyzers, means for dividing that current by the number of non-disabled analyzers to obtain the average of the currents flowing through the non-disabled analyzers, a recording instrument responsive to said average current, a movable recording tape for said instrument, and means for moving the tape in synchronism with relative movement between said two first named means.

16. Apparatus of the class described comprising graph supporting means, a movable carriage including a plurality of graph analyzers spaced from one another to analyze different graph parts simultaneously, said carriage being movable in a direction parallel to the abscissa of a graph being supported by said means, each analyzer including means adapted to follow the graph and produce an electrical condition which varies as the ordinates of the graph vary, and means for totalizing the instantaneous outputs of all of the graph analyzers.

17. Apparatus of the class described comprising graph supporting means, a carriage movable thereover, said carriage including a plurality of analyzers, each analyzer including a variable electrical resistance and means for varying the effective value of the resistance as a function of the ordinates of the graph as the carriage moves over the graph, and means for producing a current which varies as the algebraic sum of the currents produced by all of said resistances.

18. Apparatus of the class described comprising means for supporting a graph, a plurality of spaced graph analyzer means secured together to scan different graph parts simultaneously, said two named means being relatively movable so that by relative movement of the two means the graph analyzing means simultaneously scan successive parts of a graph supported by said graph supporting means, and integrating means varied by all of the analyzers simultaneously.

19. Apparatus of the class described comprising means for supporting a graph, a plurality of graph analyzer means secured together, said two named means being relatively movable so that by relative movement of the two means the graph analyzing means scans successive parts of a graph supported by said graph supporting means, a recording instrument controlled by said graph analyzing means, means for moving the graph analyzers with respect to one another while maintaining a uniform spacing between them, means controlled by each analyzer for producing a current flow which is a function of the ordinate of the graph opposite the analyzer and varying that current as a function of the ordinates of the graph upon relative movement of the graph and the analyzer, switching means for disabling any selected analyzer, means for collecting all of the current from the non-disabled analyzers, and means for dividing that current by the number of non-disabled analyzers to obtain the average of the currents flowing through the non-disabled analyzers.

LEON V. MITELMAN.